Dec. 5, 1961  T. C. FARRELL ET AL  3,011,644
STRAINER ASSEMBLY
Filed Nov. 30, 1956  3 Sheets-Sheet 1

INVENTOR
THOMAS C. FARRELL
PAUL A. MANKIN
BY Strauch, Nolan & Neale
ATTORNEYS

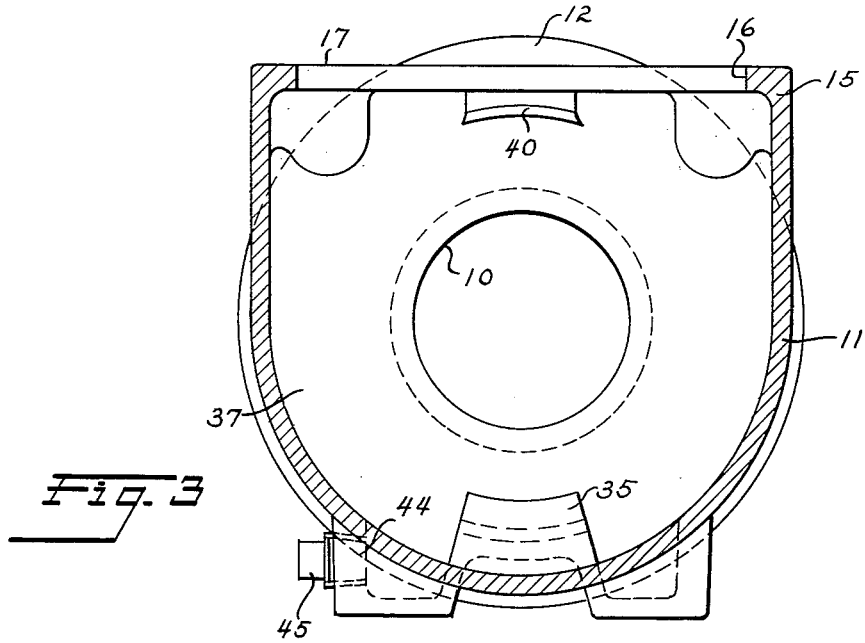
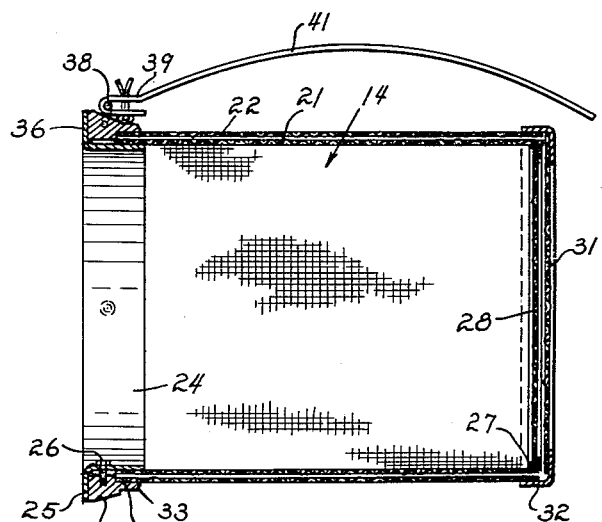
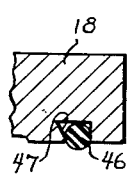 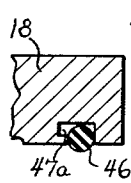

INVENTOR
THOMAS C. FARRELL
PAUL A. MANKIN
BY Strauch, Nolan & Neale
ATTORNEYS

United States Patent Office 3,011,644
Patented Dec. 5, 1961

3,011,644
STRAINER ASSEMBLY
Thomas C. Farrell, Glenshaw, and Paul A. Mankin, Pittsburgh, Pa., assignors to Rockwell Manufacturing Company, Pittsburgh, Pa., a corporation of Pennsylvania
Filed Nov. 30, 1956, Ser. No. 625,458
14 Claims. (Cl. 210—237)

This invention relates to strainer assemblies for liquid pipe lines and is particularly concerned with a novel removable and replaceable efficient screen arrangement that is easily installed and locked in operative position and may be readily removed for cleaning or replacement.

Strainers are used in liquid pipe lines upstream of meters and like mechanisms that might be damaged by fast moving and solid particles in the stream. Conventional strainers have been used but difficulty has been encountered due to liquid flow characteristics under pump pressure whereby the strained particles are usually accumulated in the strainer in such a manner as to quickly block out the available screening area and unless the strainers are very frequently cleaned localized internal pressures develop which may even burst the screen.

Removability is extremely important for cleaning the strainer, so that accessibility and facility of handling the screens have been particularly stressed in the present invention which provides a strainer assembly that makes maximum use of the screen area, is sturdy in resisting liquid pressures, requires less frequent removal for cleaning than prior strainers, and wherein the screens are easier to insert and remove than in prior strainers. Clean or unimpeded strainers are essential to maintain adequate flow rates.

It is therefore the major object of the invention to provide a novel liquid strainer assembly having a large effective screening area to accommodate high flow rates with minimum pressure drop over long periods without cleaning the strainer screens.

A further object of the invention is to provide a novel strainer assembly wherein a relatively fine screen is protectively enclosed by a strong outer screen.

It is another object of the invention to provide a novel strainer assembly wherein inner and outer screens are removably secured in assembly and may be readily separated for cleaning and replacement.

It is a further object of the invention to provide a novel strainer assembly wherein coaxial inner and outer screens have adjacent ends relatively removably secured in spaced relation, for example on telescoped rings.

A further object of the invention is to provide a strainer assembly having a removable screening basket provided with a novel spring handle arrangement.

It is a further object of the invention to provide in a strainer assembly a novel tubular screening basket wherein a relatively fine inner screen is coaxially surrounded in predetermined spaced relation by a relatively rigid coarse screen, the spacing between them being such that the coarse screen prevents undue deformation of the fine screen during operation.

A further object of the invention is to provide a novel strainer assembly wherein a screening basket has its open end resiliently urged to surround the inlet passage.

Further objects of the invention will appear as the description proceeds in connection with the appended claims and the annexed drawings wherein:

FIGURE 3 is a section on line 3—3 of FIGURE 1 with the screening basket removed to show internal structure;

FIGURE 4 is a section through the screening basket the screens being shown slightly spaced for illustration;

FIGURE 7 is an enlarged fragmentary section of the top cover edge showing detail of the O-ring seal; and FIGURE 7a is a similar view showing another embodiment of this seal.

Figure 1:
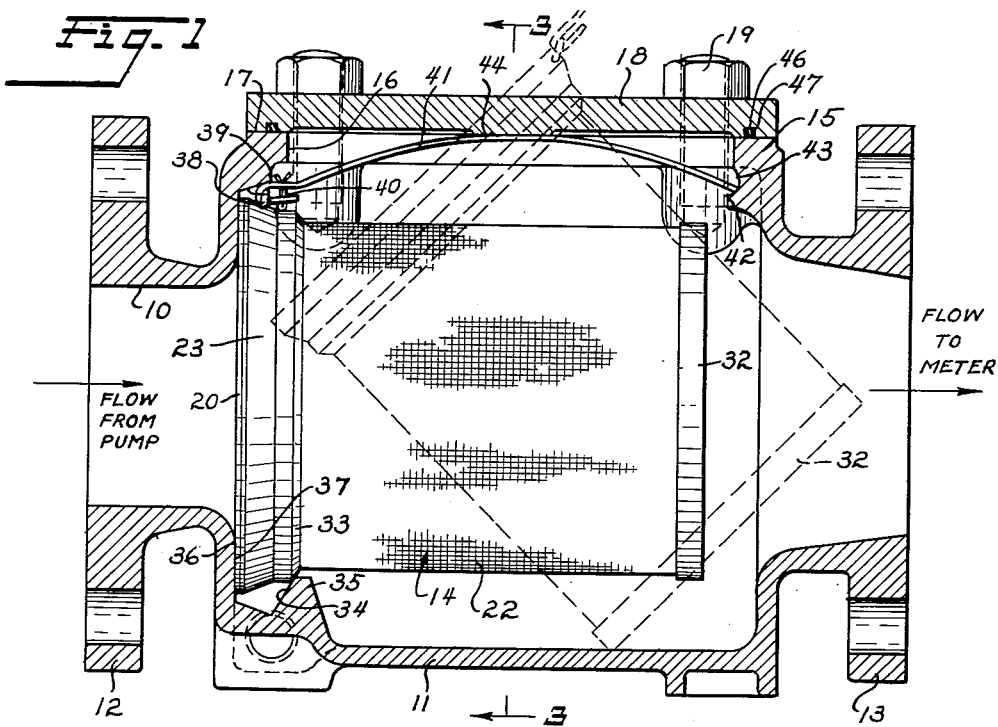
FIGURE 1 is a section through a pipe line type horizontal strainer assembly incorporating the present invention.
Figure 2:
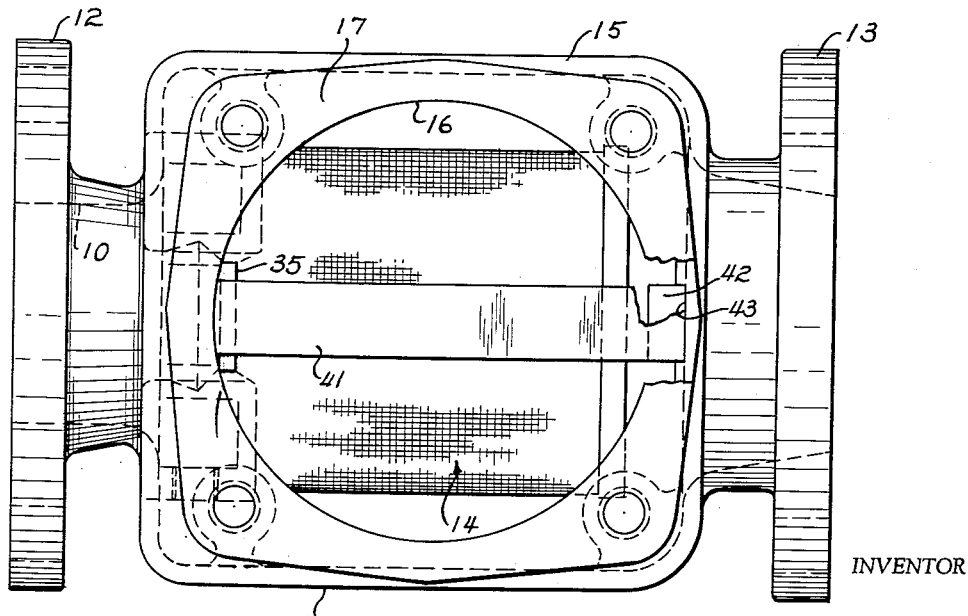
FIGURE 2 is a top plan view of the strainer assembly of FIGURE 1 with the cover removed to show the spring handle of the screening basket.

Referring to FIGURES 1–4, the strainer assembly comprises a generally cylindrical hollow body 11 having integral pipe line attachment flanges 12 and 13 at opposite ends. Body 11 is connected into a horizontal section of pipe line so that liquid at pump pressure enters through the passage 10 at flange 12 and is discharged through the passage through flange 13. The screening basket 14 is mounted within body 11 on a horizontal axis with its open mouth facing the passage through upstream flange 12.

The upper part of body 11 is formed with a suitable boss 15 integrally projecting from the walls thereof and defining an opening 16 surrounded by a flat face 17. This opening is for insertion and removal of the screening basket 14, and it is closed by a solid cover 18 normally drawn tight with body 11 as by stud assemblies 19.

Screening basket 14 comprises two slightly spaced concentric cylindrical screens 21 and 22 having their adjacent upstream ends separately secured to a solid mounting ring 20. Inner screen 21 is a relatively fine mesh wire screen, and its open end is fixed as by spot welding upon a cylindrical ring 24 that has an outer radial flange 25 abutting ring 20 and is removably secured to ring 20 as by a series of screws 26. The other end of screen 21 is a disc 28 of the same fine mesh wire and a rigid angle ring 27 is spot welded or soldered to the adjacent peripheries of the cylindrical section and disc 28.

The outer screen 22 is a relatively stiff coarse mesh screen, preferably being made of expanded metal, and its open end is seated in a shoulder recess 29 of ring 20 where it is spot welded to the ring. The other end of screen 22 is a disc 31, and a rigid angle ring 32 is spot welded or soldered to the adjacent peripheries of the cylindrical section and disc 31.

Thus both telescoped screens are fixedly mounted at their open ends on ring 20, and their parallel cylindrical walls and ends are normally disposed in closely adjacent relationship usually substantially in contact. The fine mesh wire of inner screen 21 is selected to strain out particles of predetermined size, and the coarse rigid outer screen serves as a stiff but perforated backing and support member to restrain and limit localized bulging of the relatively flexible fine mesh wire of the inner screen under high liquid pressures as will appear.

The invention contemplates using any of several size inner screens with a single size outer screen 22, so that the strainer assembly may be used for different purposes and different liquids merely by changing the readily removable inner screen. This reduces inventory. Inner screens 21 may be made of different materials as well as mesh sizes.

Inner screen 21 is normally stiff enough to support itself but as the line pressure increases and the particles accumulate therein the inner screen may tend to stretch and distort. This is prevented from exceeding a practical limit by the closely surrounding stiff expanded metal outer screen which is of such strength as to retain its shape under expected line fluid pressures. It has been found that this arrangement increases the available screening area during operation as well as protecting the inner screen from damage due to fast moving large particles.

The inner screen 21 readily separates from the outer screen 22 for cleaning or replacement of inner screen.

Mounting ring 20 has two annular continuous tapered smooth surfaces 23 and 33 the latter of which in the assembly of FIGURE 1 is disposed in contact with a correspondingly inclined smooth surface 34 of an internal lug 35 integrally projecting up from the wall of body 11. As shown in FIGURE 3, lug 35 is circumferentially short but it is of sufficient size to provide adequate abutment area to serve as a socket to position ring 20. The smooth flat end surface 36, which may be on flange 25 or machined directly in ring 20 where ring 24 may not be flanged, abuts axially against the axially facing annular smooth machined surface 37 internally of body 11.

The axial distances between surfaces 34 and 37 and the coacting surfaces on the mounting ring are chosen so that when the screening basket is in its FIGURE 1 position it is effectively held horizontal and against axial movement relative to body 11.

A bail 38 is provided on ring 20, and the looped end 39 of a bowed leaf spring steel handle 41 loosely pivots handle 41 on the screening basket 14. Spring 41 is upwardly bowed and its other end rests on a flat internally projecting ledge 42 where it abuts the recessed axially facing surface 43 of body 11. The undersurface of cover 18 is formed with an integral flat pad 44 adapted to press on the mid-point of spring 41 when cover 18 is drawn tightly into position. Once the free end of handle 41 bears against surface 43 of body 11 the pressure of pad 44 against the midpoint of handle 41 wedges the loop 39 into the space between annular tapered surface 23 on ring 21 and a divergently tapered surface 40 formed on the integral interior of housing 11. Wedging of loop 39 between surfaces 23 and 40 exerts a force on ring 20 having an axial component and downward thrust component. The axial component tightly seats the upper portion of surface 36 against surface 40 while the downward component wedges the corner portion of ring 20 between surfaces 34 and 37 to thereby firmly seat the lower portion of surface 36 against surface 37.

At its lowermost part body 11 is formed with a drain opening 44 normally closed by a threaded plug 45. Since the line type strainer is customarily placed at the lowest point in the line the drain may be used to drain the line as well as the strainer.

A sealing O-ring 46 is provided in a continuous groove 47 on the bottom of the cover 18 which is compressed against surface 17 in the assembly. As shown in FIGURE 7, the groove 47 has one vertical side wall, the other side wall being disposed at an angle thereto so that the cross-section of groove 47 is in the form of a truncated triangle. The size of the O-ring is such that it must be slightly stretched to be inserted in the groove so that when so inserted, it will be held snugly against the end side wall and the top of the groove. The top cover may therefore be removed and the O-ring 46 will be retained in the groove 47. FIGURE 7a is a modification of the O-ring groove shown in FIGURE 7 wherein the groove 47-A is undercut, as shown, to prevent the O-ring 46 from dropping out of the groove when the top cover 18 is removed.

The screening basket 14 is installed in body 11 by inserting it bottom first to approximately the position shown in dotted lines in FIGURE 1 and then tipping it counterclockwise until the lower part of ring 20 is seated in the socket between lug 35 and surface 37 and the open end of the basket has its flat smooth surface 36 parallel to and abutting smooth surface 37. Handle 41 is bowed to place its free end on ledge 42 and against surface 43. Then cover 18 is placed on the body and the studs 19 drawn tight. Compression of spring 41 results and this forces ring 20 down into its socket with the inclined faces 33, 34 serving ot wedge ring 20 against the body and effect a continuous tight seal around passage 10 at surfaces 36, 37.

To remove basket 14 it is necessary only to remove cover 18 and lift out the basket by grasping handle 41 to tip the basket clockwise through the dotted line position of FIGURE 1 until it is vertical with ring 20 uppermost and then pulling it straight out through opening 16. In this manner none of the contents of the basket are dumped into the body 11, and the screens of the removed basket may be cleaned or replaced with ease.

During operation in the assembly shown in FIGURE 1, all of the liquid from passage 10 flows through the screening basket 14, and is strained by the inner fine mesh wire screen 21. Flange 25, besides providing a flat sealing surface 36, extends over the end of ring 20 and prevents any liquid from directly entering the space between the screens 21 and 22 without first being strained by screen 21. The perforated rigid support 22 backs up the relatively flexible inner screen 21 to prevent undue stretching and retain it in a shape that provides maximum straining area.

In operation, the basket axis is in a straight line with the fluid flow so that flow is through the cylindrical side screen 21 as well as end disc screen 28. Initially, when the strainer is clean, the major portion of the fluid flow will be through the end disc screen 28. As sediment is collected on the screen 28, more and more of the flow will be through side screen 21. Thus, a large effective screening area is provided and the impact of the liquid on the strainer walls is minimized. This large screening area affords maximum straining so that the strainer accepts high flow rates with minimum pressure drop and high rates of flow can be maintained in the line with less cleaning of the strainer than hitherto possible.

Figure 5:
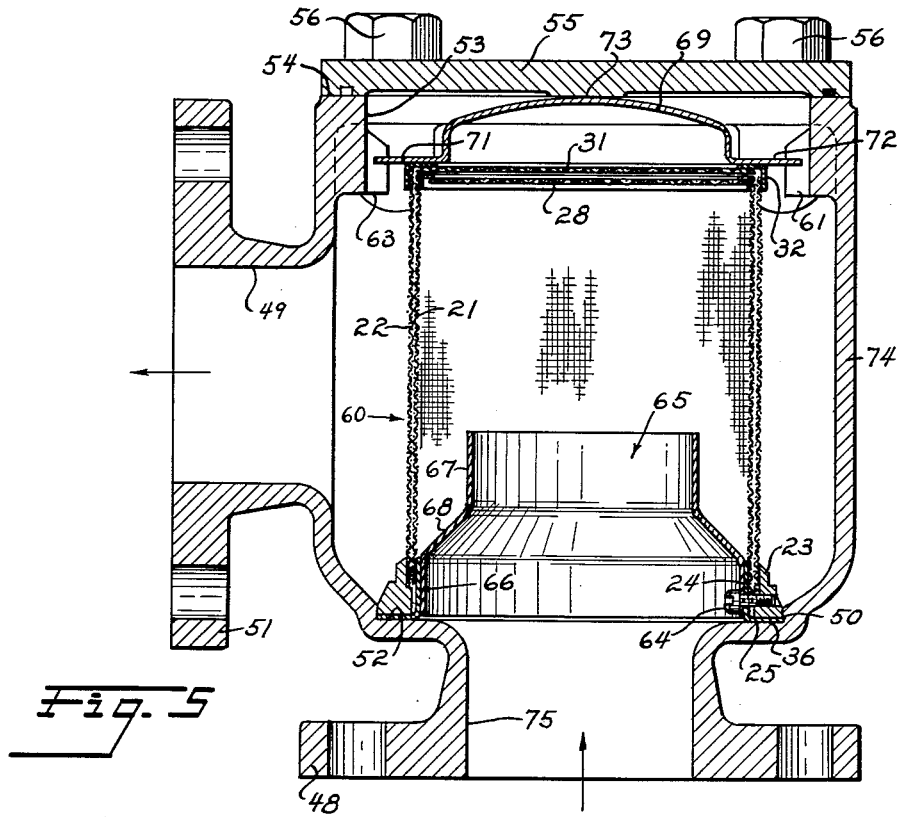
FIGURE 5 is a section through an angle type strainer assembly.
Figure 6:
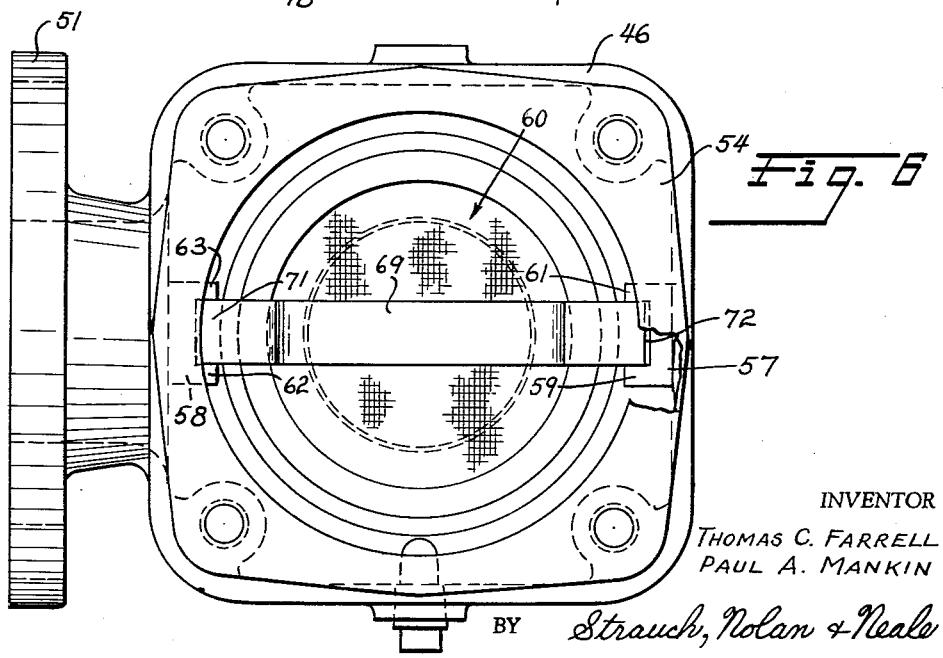
FIGURE 6 is a top plan view of the assembly of FIGURE 5 with the top cover removed to show the spring handle of the screening basket.

FIGURES 5 and 6 illustrate an embodiment of the invention wherein the strainer assembly is interposed in an angle in a pipe line for certain installations. Here the screening basket is essentially of the same double screen construction but mounted vertically instead of horizontally.

The hollow casing body 74 is open at its lower end through an inlet passage 75 surrounded by a pipe bolting flange 48, and at one side through an outlet passage 49 surrounded by bolting flange 51. Passages 75 and 49 are shown at right angles to each other but other angles may be provided.

Passage 75 is vertical and its inner end is surrounded by a flat smooth continuous annular surface 52 machined into the body and lying in a plane perpendicular to the axis of passage 75. Surface 52 is surrounded by a piloting shoulder 50 for a purpose to appear. The upper part of body 74 is formed with an opening 53 surrounded by a continuous flat smooth surface 54 upon which seats a cover 55 for the opening drawn tight by studs 56. Below opening 53 the interior of the body is formed with aligned opposed integral projections 57 and 58, which at their inner ends have spaced lugs 59, 61 and 62, 63 respectively providing open-ended U-shaped sockets or channels for a purpose to appear.

In this embodiment the basket 60 comprises an inner fine mesh wire screen 21, 28 and the outer coarse screen 22, 31 that are secured as by welding to the separate rings 20 and 24 respectively, the structure being the same as FIGURE 5 as designated by corresponding numerals of FIGURE 4. Here, however, the screws 64 that removably secure the inner and outer screens together also removably secure an inner cup 65 to ring 20. Cup 65 comprises a cylindrical portion 66 snugly telescoped in ring 24, a reduced cylindrical portion 67 within the strainer, and a connecting tapered wall portion 68, and its axis is coaxial with the telescoped screens.

At its other end the basket is provided with a diametrically extending bowed leaf spring projection 69 which has its opposite ends 71 and 72 bent straight, welded rigidly to ring 32 of the outer screen and extending radially beyond the periphery of screen 22.

In the assembly shown in FIGURE 5, with cover 55 removed, the basket 60 is dropped open end first into the body 74 until smooth surface 36 rests on smooth surface 52 and ring 20 is piloted within shoulder 50 which thus accurately centers the basket axis with passage 75. By this time the spring ends 71 and 72 have entered the channels between lugs 62, 63 and 59, 61 respectively which provide an upper end bearing for bracket 69, and the basket 60 is held against rotation about its axis.

When cover 55 is tightened in place the pad 73 on its underside engages the mid-point of spring 69 to compress it and urge surfaces 36 and 52 into tight sealing engagement. When cover 55 is removed, the spring bow 69 serves as a handle whereby the entire basket 60 may be lifted straight out of the body for cleaning and the like.

When this angle strainer is in operation the liquid to be strained enters through passage 75 into the interior of the screening basket and exits through passage 49. The strong rigid outer screen 22 here supports the inner screen 21 as in the other embodiment. The function of cup 65 is to prevent strained out particles from falling back into the line, and as the particles encounter the screen 21 and fail to pass through they drop down to accumulate in the space between the cup and screen 21 where they do not interfere with fluid flow through the strainer.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a strainer assembly, a hollow body having inlet and outlet passages and an opening for inserting and removing a screening basket, means providing a continuous smooth surface about and concentric with said inlet passage inwardly of said body, a screening basket positioned within said body coaxially with said inlet passage and having an unobstructed end surrounded by a continuous smooth surface facing said inlet passage and seating on said surface about the inlet passage in assembled relationship, a body cover adapted to be removably mounted over said opening, and means on said basket comprising a resilient bowed leaf-spring handle member for said basket, and means on said cover operative when the cover is mounted upon said body to engage said spring handle to transmit a force through said basket for urging said surfaces into tight contact.

2. In the strainer assembly defined in claim 1, said spring handle being a bowed spring element fixed to the bottom of said basket.

3. In a strainer assembly, a body having an inlet passage and an opening for inserting and removing a screening basket, a screening basket having an open end surrounded by a rigid mounting member having an external annular radial seating surface, said basket being positioned in said body with said open end and said seating surfaces facing in the direction of said inlet passage in axial alignment therewith, means adjacent said inlet passage providing an annular radial seating surface adapted to coact with said basket surface and a socket for receiving said mounting member, a cover adapted to be removably mounted over said opening, means on said basket comprising a resilient bowed leaf-spring handle and means on said cover for flexing said spring handle member when said cover is mounted over said opening to transmit a force through said basket to thereby urge said mounting member into said socket and tightly against said surface surrounding the inlet passage.

4. The strainer assembly as defined in claim 3 wherein said screening basket comprises: a ring concentrically removably secured to said mounting member, an inner fine basket-shaped screen having sufficient rigidity to retain its shape and support itself in disassembled relationship, a relatively coarse and more rigid outer basket-shaped screen, and means for securing said inner screen and said outer screen in predetermined spaced-apart relationship respectively to said mounting member and said concentric ring so that the outer screen serves to limit deformation of said inner screen under fluid pressure.

5. In a strainer assembly, a hollow body having inlet and outlet passages and an opening for inserting and removing a basket screen, means providing a continuous smooth surface about said inlet passage inwardly of said body, a screening basket within said body having an unobstructed end surrounded by a continuous smooth surface adapted to seat on said surface about the inlet passage, a body cover adapted to be removably mounted over said opening, and coacting means on said cover and said basket operative when said cover is mounted upon said body to urge said surfaces into tight contact comprising: a spring handle member for said basket adapted to be engaged by the mounted cover, said spring handle member being a bowed spring element pivoted at one end to said basket.

6. In a strainer assembly, a body having an inlet passage and an opening for inserting and removing a screening basket, a screening basket having an open end surrounded by a rigid mounting member having an external annular radial seating surface, means adjacent said inlet passage providing an annular radial seating surface adapted to coact with said basket surface and a socket for receiving said mounting member, a cover adapted to be removably mounted over said opening, means on said basket comprising a bowed spring handle pivoted at one end on said mounting member and compressed by the mounted cover for urging said mounting member into said socket and tightly against said surface surrounding the inlet passage, and means within said body for supporting the other end of said handle in the assembly in position to be engaged and compressed by said cover.

7. In a strainer assembly, a hollow body having aligned inlet and outlet passages, a screening basket having a mounting member at its open end, means forming a socket within said body for receiving said mounting member and supporting said basket with its open end in fluid tight engagement about the inner end of and facing in the direction of said inlet passage and its axis aligned with said passages, said mounting member and socket having cooperating surfaces, and resilient means within said body urging said mounting member into said socket with relative movement of said member and socket at said cooperating surfaces imparting an axially directed force to said basket to clamp it tightly to the body at the inner end of said inlet passage.

8. The strainer assembly as defined in claim 7 wherein means are provided for securing said resilient means to said screening basket for facilitating removal of said screening basket by said resilient means.

9. The strainer assembly as defined in claim 7 wherein the resilient means comprises a bowed leaf spring handle mounted at least on one end on said mounting member.

10. In a strainer assembly, a hollow body having angularly related inlet and outlet passages and an opening opposite the inlet passage, a screening basket mounted within the body with its open end seated around and facing the inner end of the inlet passage, a removable cover extending over said opening, and means comprising a spring on said basket opposite said open end, said spring being engaged and flexed by said cover to urge said basket into tight sealing engagement with said body.

11. In the strainer assembly defined in claim 10, coacting means on the body and basket for piloting the basket into alignment with said inlet passage and for preventing turning of said basket about its axis relative to said body.

12. A screening basket for a pipe line or like strainer assembly comprising concentric rings removably secured together, an inner fine screen having sufficient rigidity to retain its shape and support itself in disassembled relationship, said inner screen having side and bottom walls and having its open end peripherally fixed to one of said rings, an outer rigid member of essentially the same shape as said screen member having side and bottom walls and having its open end fixed to the other of said rings, said outer member being apertured appreciably more coarsely than said screen to provide a sturdy deformation resistant backing for said screen without appreciably inhibiting liquid flow, and a cup member associated with said inner screen and removably secured to said rings.

13. The screening basket defined in claim 12 wherein the inner of said rings is flanged to extend radially over the other ring to prevent entrance of liquid into the space between said screen and member without first passing through the screen.

14. In a strainer assembly, a hollow body having aligned inlet and outlet passages, a screening basket having a mounting member at its open end, socket means forming a socket within said body for receiving said mounting member and supporting said basket with its open end in fluid tight engagement about the inner end of and facing in the direction of said inlet passage and its axis aligned with said passages, said socket means including a recess which is formed in said body and which is adapted to receive said mounting member, said recess being open to and facing the axes of said inlet and outlet passages.

References Cited in the file of this patent

UNITED STATES PATENTS

| | | |
|---|---|---|
| 634,953 | Mueller | Oct. 17, 1899 |
| 664,280 | Leland | Dec. 18, 1900 |
| 1,284,944 | St. Pierre | Nov. 12, 1918 |
| 1,961,498 | Krueger | June 5, 1934 |
| 2,379,848 | Damme et al. | July 3, 1945 |
| 2,427,320 | Zech | Sept. 9, 1947 |
| 2,801,008 | Schmid | July 30, 1957 |